United States Patent
Krishnamoorthy et al.

(10) Patent No.: US 9,461,684 B2
(45) Date of Patent: Oct. 4, 2016

(54) FAST SYSTEM RECOVERY IN MULTI-RADIO-ACCESS-TECHNOLOGY DEVICES

(71) Applicant: QUALCOMM Incorporated, San Diego, CA (US)

(72) Inventors: Parthasarathy Krishnamoorthy, Hyderabad (IN); Bhaskara Viswanadham Batchu, Hyderabad (IN); Mihir Nabar, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 257 days.

(21) Appl. No.: 14/334,470

(22) Filed: Jul. 17, 2014

(65) Prior Publication Data
US 2016/0020800 A1   Jan. 21, 2016

(51) Int. Cl.
*H04W 72/04* (2009.01)
*H04B 1/3816* (2015.01)
*H04W 24/00* (2009.01)
(Continued)

(52) U.S. Cl.
CPC ........ *H04B 1/3816* (2013.01); *H04J 11/0069* (2013.01); *H04W 16/14* (2013.01); *H04W 24/00* (2013.01); *H04W 72/04* (2013.01); *H04W 56/0035* (2013.01)

(58) Field of Classification Search
CPC ............. H04B 1/3816; H04W 24/00; H04W 56/0035; H04W 72/04; H04W 11/0069; H04W 16/14; H04W 56/00; H04W 56/003; H04W 4/03; H04W 56/0055; H04W 88/00; H04W 88/02; H04W 88/06; H04W 28/04; H04J 11/0083
See application file for complete search history.

(56) References Cited

U.S. PATENT DOCUMENTS

| | | | |
|---|---|---|---|
| 6,453,181 B1* | 9/2002 | Challa | H03L 1/00 455/574 |
| 6,735,454 B1* | 5/2004 | Yu | H04W 52/0293 455/574 |

(Continued)

FOREIGN PATENT DOCUMENTS

| CN | 101217741 B | 7/2011 |
|---|---|---|
| WO | WO-2012/100709 A1 | 8/2012 |

OTHER PUBLICATIONS

International Search Report and Written Opinion—PCT/US2015/040071—ISA/EPO—Sep. 22, 2015 (19 total pages).

*Primary Examiner* — Meless Zewdu
(74) *Attorney, Agent, or Firm* — Arent Fox LLP

(57) ABSTRACT

Methods and apparatuses are presented for acquiring a wireless system by a multi-subscriber identity module (SIM) user equipment (UE). For example, an example method for acquiring a wireless system is presented that includes conducting, by a first subscription corresponding to a first SIM of the UE, a call using a shared radio resource of the UE. In addition, the example method may include predicting, upon completion of the call, a pilot timing error and a frequency error associated with a pilot signal of a network associated with a second subscription corresponding to a second SIM of the UE. In addition, the example method may include attempting to acquire the pilot signal based on the pilot timing error and the frequency error. As such, the example method may allow the multi-SIM UE to more quickly acquire a wireless system relative to legacy methods. Other aspects, embodiments, and features are also claimed and described.

30 Claims, 8 Drawing Sheets

(51) Int. Cl.
*H04W 16/14* (2009.01)
*H04J 11/00* (2006.01)
*H04W 56/00* (2009.01)

(56) References Cited

U.S. PATENT DOCUMENTS

| | | | |
|---|---|---|---|
| 9,167,592 B1* | 10/2015 | Hsu | H04W 4/00 |
| 9,319,999 B2* | 4/2016 | Tsuda | H04W 52/38 |
| 2006/0234693 A1* | 10/2006 | Isidore | H04M 1/72519 |
| | | | 455/422.1 |
| 2012/0135715 A1* | 5/2012 | Kang | H04W 8/183 |
| | | | 455/412.1 |
| 2012/0140709 A1 | 6/2012 | Hou | |
| 2013/0023275 A1* | 1/2013 | Mutya | H04W 88/06 |
| | | | 455/452.1 |
| 2013/0079000 A1* | 3/2013 | Syrjarinne | G01S 19/05 |
| | | | 455/427 |
| 2013/0150104 A1* | 6/2013 | Clevorn | H04L 25/0228 |
| | | | 455/501 |
| 2013/0150111 A1 | 6/2013 | Su et al. | |
| 2013/0203461 A1* | 8/2013 | Li | H04W 88/06 |
| | | | 455/552.1 |
| 2013/0295939 A1 | 11/2013 | Wegmann et al. | |
| 2014/0064117 A1 | 3/2014 | Chin et al. | |
| 2014/0106747 A1* | 4/2014 | Josso | H04W 88/06 |
| | | | 455/435.2 |
| 2014/0128082 A1* | 5/2014 | Chirayil | H04W 36/38 |
| | | | 455/438 |
| 2014/0148178 A1* | 5/2014 | Wippich | H04W 76/026 |
| | | | 455/450 |
| 2014/0228070 A1* | 8/2014 | Josso | H04W 68/00 |
| | | | 455/552.1 |
| 2015/0381332 A1* | 12/2015 | Rysgaard | H04L 5/0057 |
| | | | 455/558 |

* cited by examiner

FAST SYSTEM RECOVERY IN MULTI-RADIO-ACCESS-TECHNOLOGY DEVICES

TECHNICAL FIELD

The technology discussed below relates to wireless communications, and more particularly to methods and apparatuses for fast system recovery in user equipment (UE) configured to communicate using multiple radio access technologies (RAT). Implementation of aspects of the technology can enable and provide improved network communication and user experience.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division—Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

BRIEF SUMMARY OF SOME EXAMPLES

The following presents a summary of one or more aspects of the disclosure in-order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure describes example methods and apparatuses for acquiring a wireless system by a multi-Subscriber-Identity-Module (SIM) UE. For example, an example method for acquiring a wireless system is presented that includes conducting, by a first subscription corresponding to a first SIM of the multi-SIM UE, a call using a shared radio resource of the UE. In addition, the example method may include predicting, upon completion of the call, a pilot timing error and a frequency error associated with a pilot signal of a network associated with a second subscription corresponding to a second SIM of the UE. In addition, the example method may include attempting to acquire the pilot signal based on the pilot timing error and the frequency error.

In an additional aspect, the present disclosure describes a multi-SIM UE that may include a communications component configured to conduct, by a first subscription corresponding to a first SIM of the UE, a call using a shared radio resource of the UE. Furthermore, the example multi-SIM UE may include a pilot timing error predicting component configured to predict, upon completion of the call, a pilot timing error associated with a pilot signal of a network associated with a second subscription corresponding to a second SIM of the UE. Additionally, the example multi-SIM UE may include a frequency error predicting component configured to predict a frequency error associated with the pilot signal. Moreover, the example multi-SIM UE may include a pilot signal acquisition component configured to attempt to acquire the pilot signal based on the pilot timing error and the frequency error using the shared radio resource.

In an additional aspect, the present disclosure presents an example multi-SIM UE that may include means for conducting, by a first subscription corresponding to a first SIM of the UE, a call using a shared radio resource of the UE. In addition, the example multi-SIM UE may include means for predicting, upon completion of the call, a pilot timing error and a frequency error associated with a pilot signal of a network associated with a second subscription corresponding to a second SIM of the UE. In addition, the example multi-SIM UE may include means for attempting to acquire the pilot signal based on the pilot timing error and the frequency error.

Furthermore, the present disclosure presents an example non-transitory computer-readable storage medium, comprising instructions, that when executed by a processor, cause the processor to conduct, by a first subscription corresponding to a first SIM of a multi-SIM UE, a call using a shared radio resource of the UE. In addition, the example non-transitory computer-readable medium may include instructions, that when executed by the processor, cause the processor to predict, upon completion of the call, a pilot timing error and a frequency error associated with a pilot signal of a network associated with a second subscription corresponding to a second SIM of the UE. Moreover, the example non-transitory computer-readable medium may include instructions, that when executed by the processor, cause the processor to attempt to acquire the pilot signal based on the pilot timing error and the frequency error using the shared radio resource.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
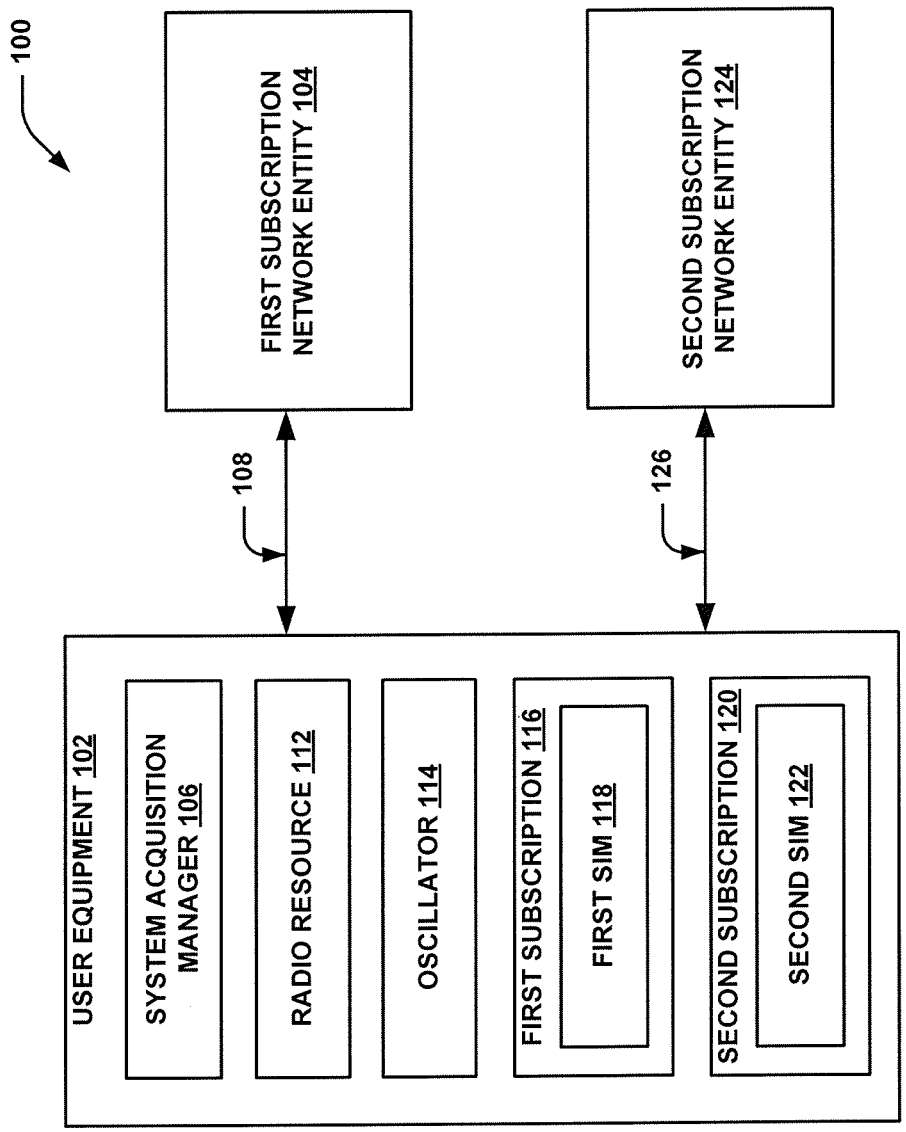
FIG. 1 is a block diagram illustrating an example wireless communications system according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Some wireless devices are configured to facilitate communication via multiple unique subscriptions, each being associated with a subscriber identity module (SIM) of multiple SIMs present on the device. In other words, multi-SIM devices (e.g., dual-SIM, dual standby (DSDS) and dual-SIM, dual active (DSDA) devices) may include one SIM associated with a first subscription and a second SIM associated with a second subscription. Furthermore, each subscription may be associated with one or more radio access technology (RAT) types.

In multi-SIM UEs, a single transceiver chain is shared between the individual subscriptions. Furthermore, if one subscription enters a traffic or access state (e.g., initiates and conducts a call) and stays in such a state for a relatively long duration, other subscriptions of the UE will be unable to monitor their respective networks (or "systems") so long as the transceiver is being utilized for the call. As a result, in some instances, the non-call subscription will forcefully declare that the system is lost. In addition, as the subscription is unable to monitor its network due to resource unavailability, the UE is unable to obtain information associated with one or more cells of the network, such as pilot timing error and frequency error.

When a subscription declares system lost, it can take a relatively long time (e.g., approximately four seconds to upwards of thirty seconds, depending upon channel conditions) to reacquire the system using legacy algorithms. This process of repeatedly declaring a system lost for the reason of resource unavailability and reacquiring the system using the legacy algorithm is an inefficient approach for several reasons. For instance, as introduced above, the system acquisition procedure using the legacy algorithm is a time-consuming activity and hence other subscription performance will be severely impacted during that time frame. For example, the other subscriptions may miss call pages, which will result in UE performance degradation.

Furthermore, when the non-call subscription forcefully declares system lost, the UE is unable to initiate or conduct calls regardless of the instantaneous coverage quality of the subscription. For example, when a first subscription is in a call, the second subscription may forcefully declare system lost. Once the call is completed on the first subscription, the UE will not be able to make calls immediately using the second subscription, as it has already declared the system lost.

Moreover, these problems may be exacerbated in Triple-SIM, Triple-Standby (TSTS), QuadSIM, or OctaSIM devices, as more subscriptions would be vying for use of the single transceiver chain. As each of the subscriptions would take considerable time to acquire its respective system using the legacy algorithm, a greater number of the subscriptions of the UE may be unable to quickly and efficiently acquire their respective network systems.

Thus, as multi-SIM and/or multi-RAT UEs share limited communication resources, there is a need for methods and apparatuses to allow for quicker and more efficient system acquisition for non-call subscriptions of the UE, for example, after a completion of a call on another subscription of the UE.

As such, the present disclosure presents methods and apparatuses for improved system acquisition procedures associated with one or more subscriptions of a multi-SIM UE, which, in some examples, may include several corresponding radio access network subscriptions associated with one or more radio access technologies. In an aspect of the present disclosure, a first subscription of the multi-SIM UE may initiate and conduct a call using a shared radio resource of the UE. In an example operational scenario, a multi-SIM device may initiate a call on a first subscription using a shared radio resource. Because only a single radio resource (e.g., radio, antenna, transceiver, etc.) may exist on the multi-SIM device, that single radio resource may be shared by the first subscription and a second subscription. Thus, as the shared radio resource may be used exclusively by the first subscription during the call, the second subscription (and/or further subscriptions) of the multi-SIM device may be unable to receive incoming paging, control, overhead, or other messages transmitted by their corresponding networks or perform cell reselection or other control operations during the ongoing call on the first subscription. In a particular example, according to some methods, when a subscription of a multi-SIM UE is unable to access the radio resource during a call on another subscription, the subscription may declare the system lost, and as a result, is required to perform a lengthy full-frequency cell search to detect a paging signal associated with a network cell in an attempt to reacquire its network (e.g., camp on a network cell or otherwise reinitiate communicative contact with the network). Moreover, as pilots are transmitted by network cells at a unique frequency and at precise instances defined by a pilot transmission cycle, the radio resource (e.g., transceiver or receiver) must be tuned to the correct frequency at a particular time instant to receive the pilot signal.

However, as the radio resource may be handed over to a non-call subscription at an unpredictable instant that is dependent on the duration of the call, there may exist a time offset, or "pilot timing error," between the time the call is completed and the time instant that the pilot signal is transmitted by the cell. In other words, if the non-call subscription were to tune to the pilot signal frequency at the instant that the radio resource is handed over to the non-call subscription, and that instant does not correspond to a pilot transmission interval time at which the pilot signal is transmitted by the cell, the pilot signal will not be received by the non-call subscription. Thus, the non-call subscription must account for the pilot timing error when attempting to tune the radio resource to the pilot signal frequency to ensure that the pilot signal is able to be received.

Furthermore, as oscillators in the UE that tune the radio resource to a particular pilot frequency are temperature-dependent, a frequency error may exist with respect to the pilot signal where the UE and its oscillators undergo a temperature change. As such, when the radio resource is handed over to the non-call subscription to perform a pilot signal search, any temperature change (e.g., in the UE or in the oscillators of the UE) and resulting frequency error must be accounted for to ensure that the radio resource is tuned to the precise frequency associated with the pilot signal transmitted by a particular cell.

Therefore, in an aspect of the present disclosure, rather than declare its system lost during a cell on a first subscription of a multi-SIM UE, which would result in a lengthy legacy system acquisition process upon completion of the call, the second subscription may instead predict a pilot timing error and pilot frequency error associated with a last cell upon which the subscription was camped before the call and may attempt to acquire the pilot signal based on the pilot timing error and pilot frequency error. As the pilot timing error may be dependent on the elapsed time of the call associated with the first subscription, the UE may monitor this elapsed time in order to calculate the pilot timing error. In an aspect, the elapsed time may comprise a time duration (e.g., corresponding to the call on the first subscription) during which the second subscription is not able to utilize the radio resource to monitor its network. For example, in some instances, the elapsed time may begin when a page is received by the first subscription, thereby initiating the call process. Furthermore, as the frequency error may depend upon any temperature change of the UE or oscillator therein that may have occurred during the second call, the UE may monitor the temperature of the UE (or oscillator) at certain instances (e.g., before the call or as the call is initiated, during the call, and/or after the call has completed) in order to facilitate frequency error prediction.

FIG. 1 is a schematic diagram illustrating a system 100 for wireless communication, according to an example configuration. FIG. 1 includes an example first subscription network entity 104, which may communicate wirelessly with a first subscription 116 of one or more UEs 102 over one or more wireless communication channels 108, which may include, in a non-limiting aspect, data communication channels, paging channels, and control channels. In an aspect, the specific first subscription network entity 104 in communication with the UE 102 may change with time and location based on cell handover during a call conducted by the first subscription 116 as UE 102 moves geographically. Additionally, FIG. 1 includes an example second subscription network entity 124, which may communicate wirelessly with a second subscription 120 of one or more UEs 102 over one or more wireless communication channels 126, which may include, in a non-limiting aspect, data communication channels, paging channels, and control channels. During a call conducted by the first subscription 116, communication with second subscription network entity 124 may cease by virtue of a shared radio resource 112 being fully utilized by the first subscription 116 and/or the second subscription 120 entering a sleep or idle state.

UE 102 may comprise any type of mobile or communications device. These can include devices, such as, but not limited to, a smartphone, cellular telephone, mobile phone, laptop computer, tablet computer, a device associated with the Internet of Things (IoT), or other portable networked device. In addition, UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, an entertainment device, a vehicular component, or some other suitable terminology. In general, UE 102 may be small and light enough to be considered portable and may be configured to communicate wirelessly via an over-the-air communication link using one or more OTA communication protocols described herein.

Additionally, in some examples, UE 102 may be configured to facilitate communication on a plurality of separate networks via a plurality of separate subscriptions, such as, but not limited to, a first subscription 116 and a second subscription 120. As such, UE 102 may comprise a multi-SIM UE (e.g., dual SIM, dual standby (DSDS) UE, dual SIM, dual active (DSDA), triple SIM, triple standby (TSTS), QuadSIM UE, OctaSIM, or a UE having any number of unique SIM cards and/or subscriptions), which may include two SIM cards—a first SIM card 118 for the first subscription 116 and a second SIM card 122 for the second subscription 120. Furthermore, although only two SIMs and two subscriptions are illustrated in FIG. 1, the UE 102 may contain any number of subscriptions and related SIMs. For example, in some examples, each subscription may facilitate communication via a plurality of radio access technologies (RATs) or may facilitate communication via a single RAT. In an aspect, the specific RAT or RATs supported by a particular subscription may comprise any RAT or RATs known in the art and/or disclosed herein.

In an aspect, communication channels 108 and 126 may comprise any over-the-air (OTA) communication channel. These can include, but are not limited to, one or more data or control communication channels operating according to specifications promulgated by 3GPP and/or 3GPP2, which may include first generation, second generation (2G), third generation (3G), fourth generation (4G), etc. wireless network communication protocols.

The UE 102 may also include a system acquisition manager 106. The system acquisition manager 106 can be configured to manage acquisition of a wireless network system or an associated cell upon which one or both of first subscription 116 and second subscription 120 may camp (e.g., when operating in idle mode) and/or a cell that may facilitate communication during or after a call associated with first subscription 116 or second subscription 120. System acquisition manager 106 is discussed in detail below in reference to FIG. 2. Furthermore, in an aspect, radio resource 112 may be shared by first subscription 116 and second subscription 120, and may comprise a transceiver, receiver, transmitter, and/or related circuitry for performing wireless communication with first subscription network entity 104 and/or second subscription network entity 124.

In addition, UE 102 may include an oscillator 114, which may be configured to maintain a frequency upon which pilot signal acquisition by the radio resource 112 may be based. In an aspect, oscillator 114 may be a crystal oscillator or piezoelectric oscillator, but may alternatively include any other oscillator or clock maintaining component known in the art. In some aspects, the oscillator 114 may include circuitry that provides control for the frequency generated by the oscillator 114. Furthermore, the frequency associated with oscillator 114 may be dependent upon a temperature of the oscillator 114, which in some examples, may correspond to the temperature of the UE 102, generally. As such, where the temperature associated with the oscillator 114 and/or the UE 102 changes over time, a frequency offset may develop between the true oscillator frequency and the frequency to which the oscillator is calibrated. For purposes of the present disclosure, this frequency offset may be referred to as a "frequency error" or "pilot frequency error." In an aspect of the present disclosure, system acquisition manager 106 may be configured to compensate for the frequency error associated with oscillator 114 when performing a pilot signal search associated with a system acquisition process upon completion of a call by first subscription 116.

Furthermore, first subscription network entity 104 and second subscription network entity 124 of FIG. 1 may comprise one or more of any type of network module, such as an access point, a macro cell, including a base station (BS), node B, eNodeB (eNB), a relay, a peer-to-peer device, an authentication, authorization and accounting (AAA) server, a mobile switching center (MSC), a radio network controller (RNC), or a small cell. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell. Additionally, first subscription network entity 104 may communicate with one or more other network entities of wireless and/or core networks Additionally, system 100 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (WCDMA) system, and may communicate with one or more UEs 102 according to this standard. As those skilled in the art will readily appreciate, various aspects described throughout this disclosure may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g., UEs 102, first subscription network entity 104, second subscription network entity 124) may be coupled to a core network via one or more wired or wireless connections.

Figure 2:
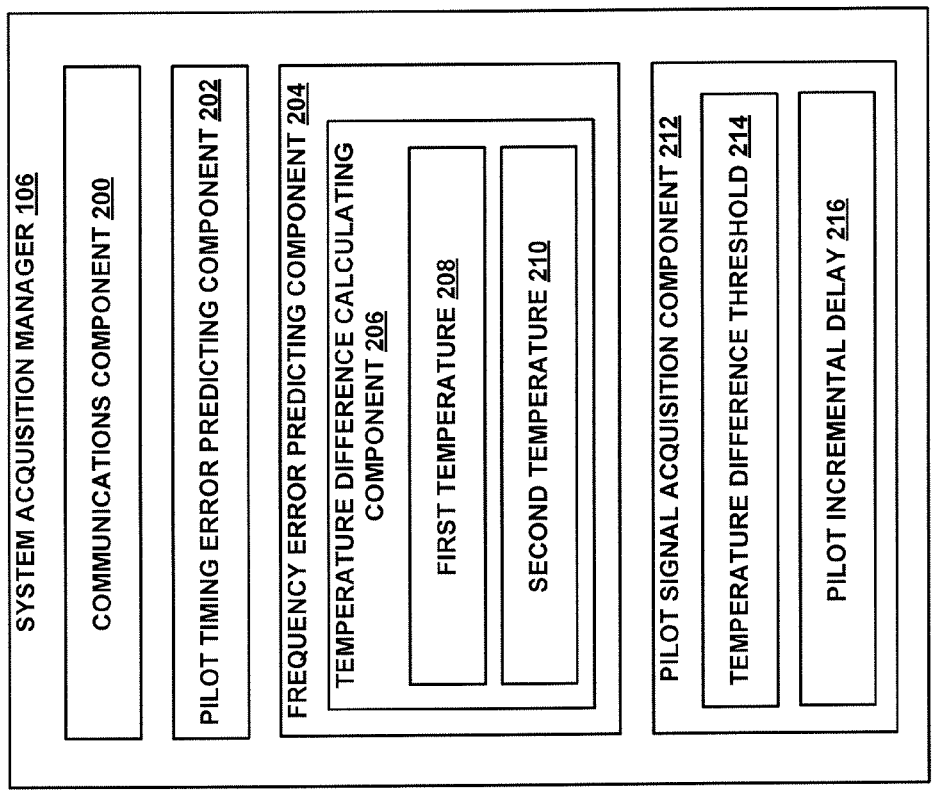
FIG. 2 is a block diagram illustrating an example cell selection manager according to some embodiments.

Turning to FIG. 2, an example system acquisition manager 106 (of FIG. 1, for example) is presented as comprising a plurality of individual components for carrying out the one or more methods or processes described herein. For purposes of the present disclosure, the term "component" or "components" may refer to one or more parts that make up a system or UE, may be hardware or software, and may be divided into other components (e.g., sub-components). In some examples, any "component" described herein may be implemented by executing software, which may be stored on a non-transitory computer-readable medium, on a processor. In other examples, any "component" of the present disclosure may comprise one or more discrete processing entities (e.g., processors or other processing hardware) that may be configured to perform one or more functions described herein.

For example, in an aspect, system acquisition manager 106 may include a communications component 200. In an aspect, communications component 200 may be configured to initiate, establish, conduct or perform, and terminate one or more calls, communication sessions, or the like with one or more network entities associated with a first or second subscription of a UE. For example, communications component 200 may be configured to initiate and conduct or perform a call associated with a first subscription corresponding to a first SIM of a UE. In an aspect, such a call may include a packet-switched, circuit-switched, data, voice, messaging, streaming, or any other type of data exchange between the UE or system acquisition manager 106 and a network entity with which the UE is in communication. Furthermore, communications component 200 may be configured to receive data packets in the downlink and transmit data packets, measurement reports, packet acknowledgement messages, etc., in the uplink. Furthermore, in an aspect, communications component 200 may include and/or comprise radio resource 112 of FIG. 1.

Moreover, communications component 200 may be configured to receive, by the first subscription or second subscription of the UE, one or more pilot signals from a cell upon completion of the call. In an aspect, this cell may be a final cell with which the second subscription was in communication before the call was initiated by the first subscription, or, in other words, was the last serving cell of the second subscription immediately preceding the call or the point in time that the radio resource was handed over to a subscription other than the second subscription. In an alternative or additional aspect, the cell may be any cell with which the second subscription was in communication before the call.

In an additional aspect, communications component 200 may be configured to determine whether each of a plurality of pilot signals corresponding to each subscription of the UE is acquired. Furthermore, the communications component 200 may be configured to initiate a slotted mode of radio resource allocation based on determining that each of the plurality of pilot signals is acquired. For example, upon a determination that each of the plurality of pilot signals has been acquired, the communications component 200 may send a message to the shared radio resource (e.g., radio resource 112) to instruct the radio resource to initiate a slotted mode of radio resource allocation. This slotted mode of operation corresponds to a radio resource scheduling scheme whereby the radio resource is successively allocated to each subscription for a particular period of time. This allows each subscription to briefly communicate with its corresponding network, for example, to monitor a paging channel and receive and decode paging messages, receive control or overhead information from its corresponding network, or otherwise receive information from or transmit signals to the network. For example, in a non-limiting example, a UE may includes three subscriptions and each slot of the slotted mode of operation has a set duration of 10 ms. In such an example, the radio resource may be handed to a first subscription for a time period of 10 ms (e.g., time period 0-10 ms), then handed over to a second subscription for a next time period of 10 ms (e.g., time period 10 ms-20 ms), then handed over to a third subscription for a next time period of 10 ms (e.g., time period 20 ms-30 ms), and finally handed back to the first subscription for a next time period of 10 ms (e.g., 30 ms-40 ms), and so on.

In an additional aspect, system acquisition manager 106 may include a pilot timing error predicting component 202. In an aspect, pilot timing error predicting component 202 may be configured to predict a pilot timing error associated with a pilot signal of a network associated with the second subscription. The prediction of the pilot timing error may be based on information obtained, measured, determined, or otherwise collected by the system acquisition manager 106. In an aspect, the pilot timing error may comprise an amount of time or time offset between (a) an instant that the shared radio resource is handed over to the second subscription (e.g., a non-call subscription) from a first subscription upon completion of a call on the first subscription and (b) a scheduled pilot signal transmission time associated with a cell. In other words, as the shared radio resource of the UE may be handed over for use by the second subscription when the call on the first subscription has completed, and the call may be completed at any time, there may exist an offset between a scheduled pilot transmission time associated with the cell and the instant that the radio resource is handed over to the second subscription. This offset, which, for the purposes of the present disclosure, corresponds to the "pilot timing error," allows the second subscription to tune the radio resource to a frequency corresponding to the pilot signal of a cell at a time at which the cell is scheduled to transmit the pilot signal.

In some examples, the pilot timing error predicting component 202 may be configured to maintain a scheduled pilot transmission periodicity associated with the cell, which may be received and saved by the UE prior to the call on the first subscription. From this scheduled pilot transmission periodicity, the pilot timing error predicting component 202 may determine the time instants at which the pilot signal is scheduled to be transmitted by the cell, or, correspondingly, a time at which the pilot signal is scheduled to be received at the UE (for example, taking into account any signal transmission delay). Likewise, the pilot timing error predicting component 202 may be configured to maintain an elapsed time of the call on the first subscription. As such, the UE can compare a next scheduled pilot transmission time (which may be based on the scheduled pilot transmission periodicity) to a time that the radio resource is handed back to the second subscription upon completion of the call (which may be based on the elapsed time of the call) and determine that the pilot timing error corresponds to the time difference between the two times.

In an additional aspect, system acquisition manager 106 may include a frequency error predicting component 204. In an aspect, frequency error predicting component 204 may be configured to predict a temperature-dependent frequency error associated with a UE oscillator (e.g., oscillator 114 of FIG. 1) upon which the pilot signal receiving process of the UE may depend. Thus, to make this prediction, the frequency error predicting component 204 may be configured to extrapolate or estimate the frequency error based on certain observed temperature values of the oscillator (or the UE, generally). Although not shown, the UE 102 may include one or more sensors capable of taking temperature measurements of the UE 102 and/or the oscillator 114. In some aspects, such sensors may be included in the system acquisition manager 106. As such, the frequency error predicting component 204 may include a temperature difference calculating component 206. In an aspect, temperature difference calculating component 206 may be configured to determine a temperature difference, or temporal temperature change, between a first temperature 208 observed at a first time instant and a second temperature 210 received at a second time instant. In an aspect, the first time instant may correspond to a time instant before the call on the first subscription is initiated, and thus the first temperature 208 of the oscillator may correspond to the temperature observed prior to a call on the first subscription. Likewise, the second time instant may correspond to a time instant at which the call is completed or a time instant at which the shared radio resource of the UE is handed back to the second subscription upon completion of the call. Accordingly, the second temperature 210 may correspond to the observed temperature of the oscillator upon the completion of the call or the time at which the radio resource is handed over for use by the second subscription. Thus, the temperature difference between first temperature 208 and second temperature 210 may comprise a temperature difference that occurs during the elapsed time of the call associated with the first subscription.

In an additional aspect, frequency error predicting component 204 may be configured to predict the frequency error of the oscillator based on the calculated temperature difference between first temperature 208 and second temperature 210. For example, in an aspect, frequency error predicting component 204 may be configured to evaluate the following formula to determine an estimate of a Recent Good System (RGS) at temperature $t_2$ (second temperature 210), where the RGS represents the frequency error seen by a particular subscription at $t_2$:

$$RGS_{t_2} = RGS_{t_1} + (F(t_2) - F(t_1))$$

In an additional aspect, the above formula is characterized by the following function, F(t), which may provide an estimate of a frequency error as a function of temperature (t), and may be evaluated by frequency error predicting component 204:

$$F(t) = c_3(t-t_0)^3 + c_2(t-t_0)^2 + c_1(t-t_0) + c_0$$

Here, $c_3$, $c_2$, $c_1$, and $c_0$ each represents a coefficient that characterize a frequency error versus temperature (F-T) curve. These coefficients may be estimated through linear regression methods performed on frequency error and temperature values that may be calculated throughout the lifetime of a UE. Furthermore, $t_0$ represents a constant called the "inflection point," which represents the temperature value at which the F-T curve intersects the frequency error axis. In other words, $t_0$ represents a temperature value at which the frequency error is zero.

Moreover, system acquisition manager 106 may include a pilot signal acquisition component 212. In an aspect, pilot signal acquisition component 212 may be configured to attempt to acquire the pilot signal associated with one or more cells of a wireless system of the second subscription based on the pilot timing error and the frequency error, for example, using the shared radio resource of the UE. In other words, pilot signal acquisition component 212 may be configured to obtain the pilot timing error predicted by pilot timing error predicting component 202 and the frequency error predicted by frequency error predicting component 204 and may tune the radio resource (a) to a particular frequency that is based on the predicted frequency error and (b) at a particular time that is based on the predicted pilot timing error in an attempt to receive a pilot signal transmitted by a cell of the wireless system or network associated with the second subscription.

Furthermore, pilot signal acquisition component 212 may be configured to attempt to acquire the pilot signal only where certain conditions are met. For example, because a frequency error prediction may become inaccurate when a temperature difference (e.g., between first temperature 208 and second temperature 210) increases over time, the pilot signal acquisition component 212 may be configured to attempt to acquire the pilot signal only where it is determined by the pilot acquisition component 212 that the temperature difference is less than or equal to a temperature difference threshold 214. In an aspect, temperature difference threshold 214 may comprise a value of any temperature difference, but in some examples, may include a temperature difference in the range of 1 degree Celsius to 20 degrees Celsius. In some examples, the temperature difference threshold 214 may be 4 degrees Celsius or about 4 degrees Celsius. By comparing the calculated temperature difference between first temperature 208 and second temperature 210 to the temperature threshold and proceeding with an attempt to acquire the pilot signal only where the temperature difference is less than or equal to the temperature difference threshold, the pilot signal acquisition component 212 can ensure that relatively large temperature differences experienced over the elapsed time of the call will not be so great as to comprise the accuracy of the pilot signal acquisition attempt. Thus, because the frequency error measurement may become inaccurate as the observed temperature difference values increase, system acquisition manager 106 may be configured to utilize legacy pilot and system acquisition processes (e.g., full frequency pilot searching not based on predicted pilot timing error and predicted frequency error) where the temperature difference is greater than the temperature difference threshold 214.

Moreover, pilot signal acquisition component 212 may be configured to attempt to acquire the pilot signal only where it is determined that the pilot timing error predicted by pilot timing error predicting component 202 is less than or equal to a pilot increment delay associated with the pilot signal. In an aspect, the pilot increment delay may comprise a time delay value associated with the pilot signal, such as a pilot pseudonoise (PN) offset associated with a sector of a particular network entity (e.g., base station, eNodeB, etc.). Therefore, pilot signal acquisition component 212 may be configured to compare the pilot timing error to the pilot incremental delay 216 to determine whether the pilot timing error is less than or equal to the pilot incremental delay 216. Where it is determined that the pilot timing error is greater than the pilot incremental delay 216, system acquisition manager 106 may be configured to utilize legacy pilot and system acquisition processes (e.g., full frequency pilot searching not based on predicted pilot timing error and predicted frequency error).

Through exemplary components 202, 204, 206, 208, 210, 212, 214, and 216 are presented in reference to system acquisition manager 106, they are not exclusive. Instead, system acquisition manager 106 may include additional or alternative components configured to perform aspects of the present disclosure and the claims recited below.

Figure 3A:
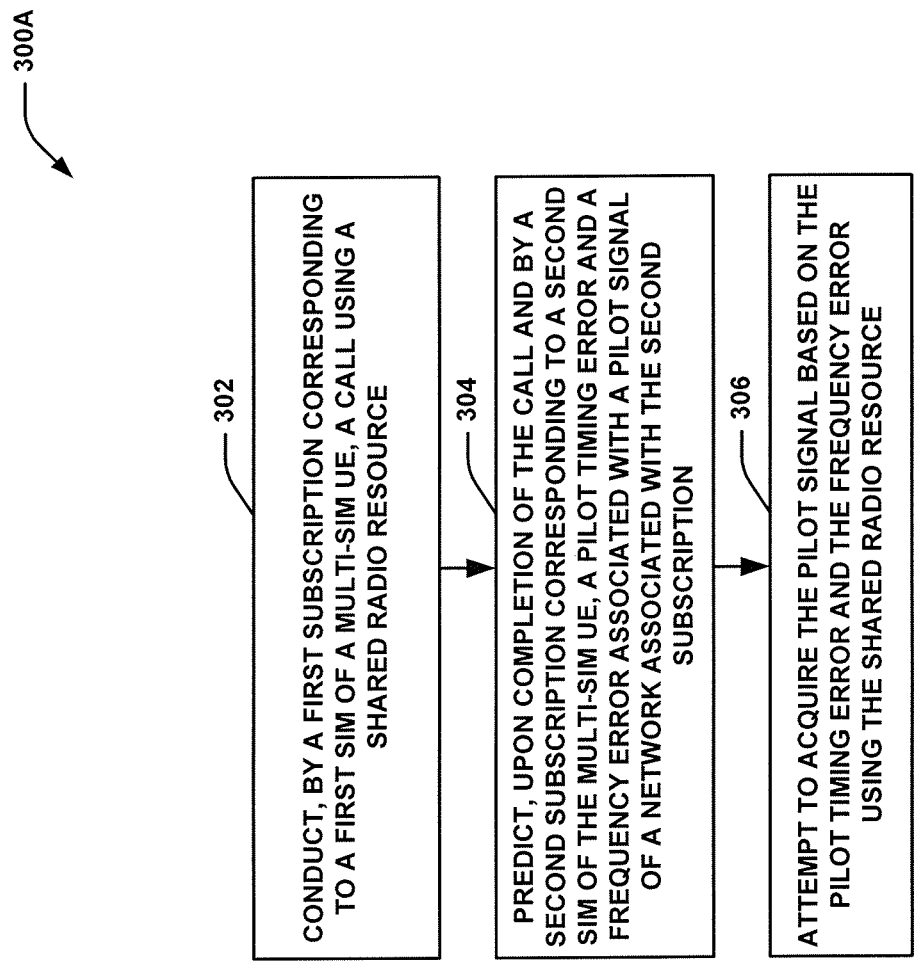
FIG. 3A is a method flow diagram comprising a plurality of functional blocks according to some embodiments.
Figure 3B:
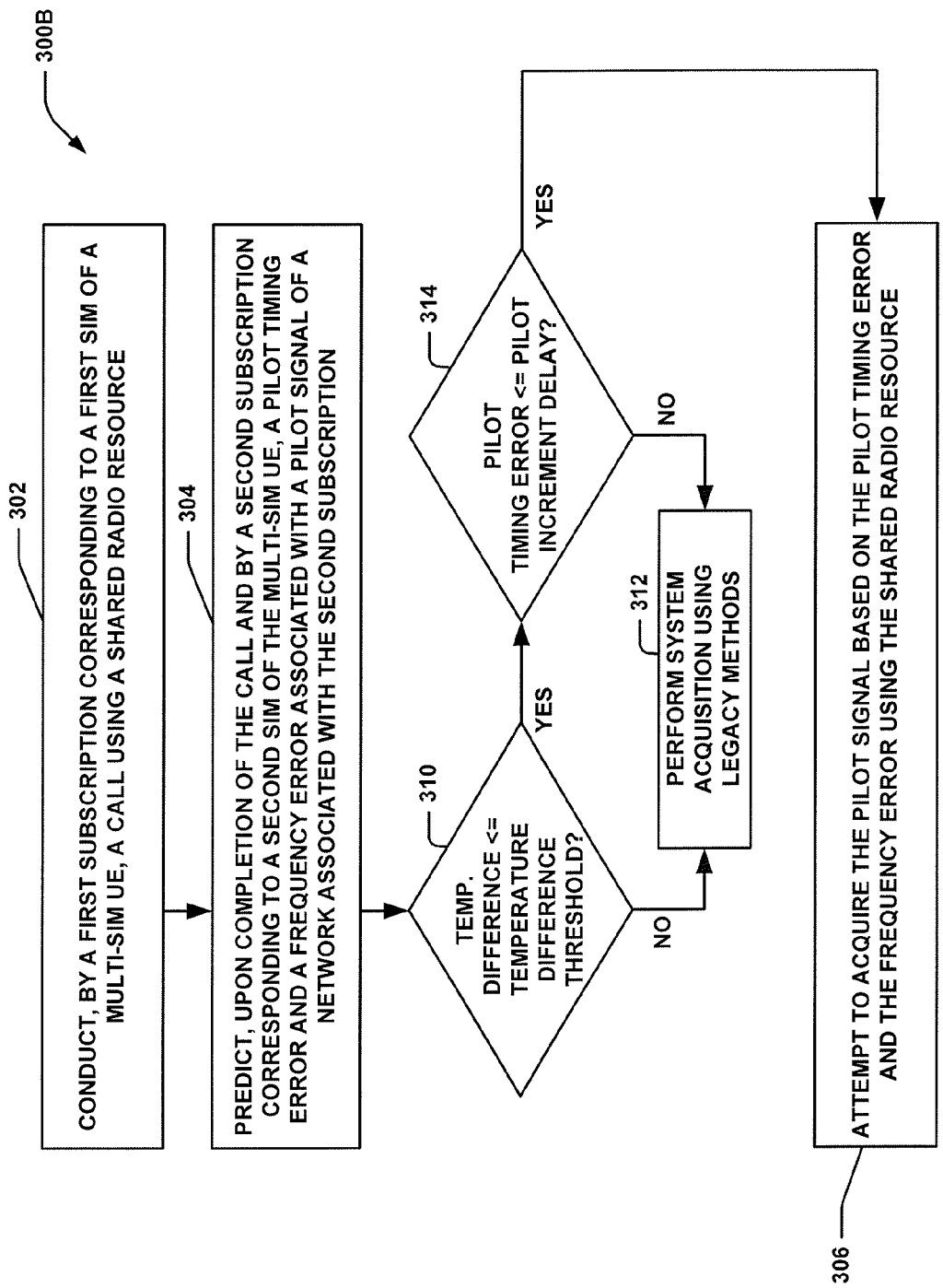
FIG. 3B is a method flow diagram comprising a plurality of functional blocks according to some embodiments.

FIGS. 3A and 3B present exemplary methodologies 300A and 300B, each comprising a non-limiting set of steps represented as blocks that may be performed by an apparatus described herein (e.g. user equipment 102 of FIG. 1, system acquisition manager 106 of FIGS. 1 and 2). In an aspect, methodology 300A and 300B may be related, and may include one or more shared or overlapping functions or steps.

Turning to FIG. 3A, in an aspect, methodology 300A may comprise a method of acquiring a wireless system by a multi-SIM UE, for example, upon completion of a call associated with another subscription of the UE. For example, methodology 300 may include, at block 302, conducting, by a first subscription corresponding to a first SIM of the multi-SIM UE, a call using a shared radio resource of the UE. In an aspect of the present disclosure, block 302 may be performed by communications component 200 of FIG. 2.

In addition, at block 304, methodology 300A may include predicting, upon completion of the call and by a second subscription corresponding to a second SIM of the multi-SIM UE, a pilot timing error and a frequency error associated with a pilot signal of a network associated with the second subscription. In an aspect, block 304 may be performed by one or both of pilot timing error predicting component 202 and frequency error predicting component 204 of FIG. 2. For example, pilot timing error predicting component 202 may be configured to predict the pilot timing error and frequency error predicting component 206 may be configured to predict the frequency error associated with block 204.

Furthermore, at block 306, methodology 300A may include attempting to acquire the pilot signal based on the pilot timing error and the frequency error, for example, using the shared radio resource of the UE. In an aspect, block 306 may be performed by at least pilot signal acquisition component 212 of FIG. 2.

Turning to FIG. 3B, as introduced above, methodology 300B of FIG. 3B may include aspects of methodology 300A and may include additional aspects. For example, like methodology 300A of FIG. 3A, methodology 300B may include, at block 302, conducting, by a first subscription corresponding to a first SIM of the multi-SIM UE, a call using a shared radio resource of the UE. Again, in an aspect of the present disclosure, block 302 may be performed by communications component 200 of FIG. 2.

In addition, at block 304, methodology 300B may include predicting, upon completion of the call and by a second subscription corresponding to a second SIM of the multi-SIM UE, a pilot timing error and a frequency error associated with a pilot signal of a network associated with the second subscription. In an aspect, block 304 may be performed by one or both of pilot timing error predicting component 202 and frequency error predicting component 204. For example, pilot timing error predicting component 202 may be configured to predict the pilot timing error and frequency error predicting component 206 may be configured to predict the frequency error associated with block 204.

In addition, at block 310, methodology 300B may include determining whether a temperature difference between a first temperature measured before the call and a second temperature measured after completion of the call is less than or equal to a temperature difference threshold. In an aspect, this determination may include first calculating the temperature difference between a first temperature measured before the call and a second temperature measured after completion of the call and subsequently comparing the temperature difference to the temperature difference threshold. In some examples, the temperature difference threshold may comprise a temperature difference value of about 4 degrees Celsius. In other examples, the temperature difference threshold may comprise a temperature difference value of more or less than 4 degrees Celsius. In an aspect, block 310 may be performed by pilot signal acquisition component 212 of FIG. 2.

Furthermore, where it is determined that the temperature difference is greater than (or, in some examples, equal to) the temperature difference threshold, methodology 300B may proceed to block 312, whereby the UE may simply revert to performing system acquisition according to legacy methods, such as a relatively lengthy full frequency scan procedure.

Where, however, it is determined at block 310 that the temperature difference is less than or equal to the temperature difference threshold, methodology 300B may proceed to block 314. At block 314, methodology 300B may include determining whether a pilot timing error predicted at block 304 is less than or equal to a pilot increment delay associated with the pilot signal. In an aspect, block 314 may be performed by pilot signal acquisition component 212 of FIG. 2. Where it is determined at block 314 that the pilot timing error is greater than (or, in some examples, equal to) the pilot increment delay, methodology 300B may proceed to block 312, whereby the UE may revert to performing system acquisition according to legacy methods. Alternatively, where it is determined at block 314 that the predicted pilot timing error is less than or equal to the pilot increment delay, methodology 300B may proceed to block 306. Like methodology 300A, block 306 of methodology 300B may include attempting to acquire the pilot signal based on the pilot timing error and the frequency error, for example, using the shared radio resource of the UE. In an aspect, block 306 may be performed by at least pilot signal acquisition component 212 of FIG. 2. In addition, because the conditions presented in blocks 310 and 314 may be met before methodology 300B proceeds to block 306, block 306 may effectively include attempting to acquire the pilot signal based on the timing error and the frequency error only where the temperature difference is less than or equal to a temperature difference threshold and the pilot timing error is less than or equal to the pilot increment delay.

In addition, although FIG. 3B shows that blocks 310 and 314 are performed sequentially, this is only an example process arrangement. For example, rather than block 310 being performed before block 312, block 312 may instead be performed before block 310, or block 310 and block 312 may be performed substantially contemporaneously.

Figure 4:
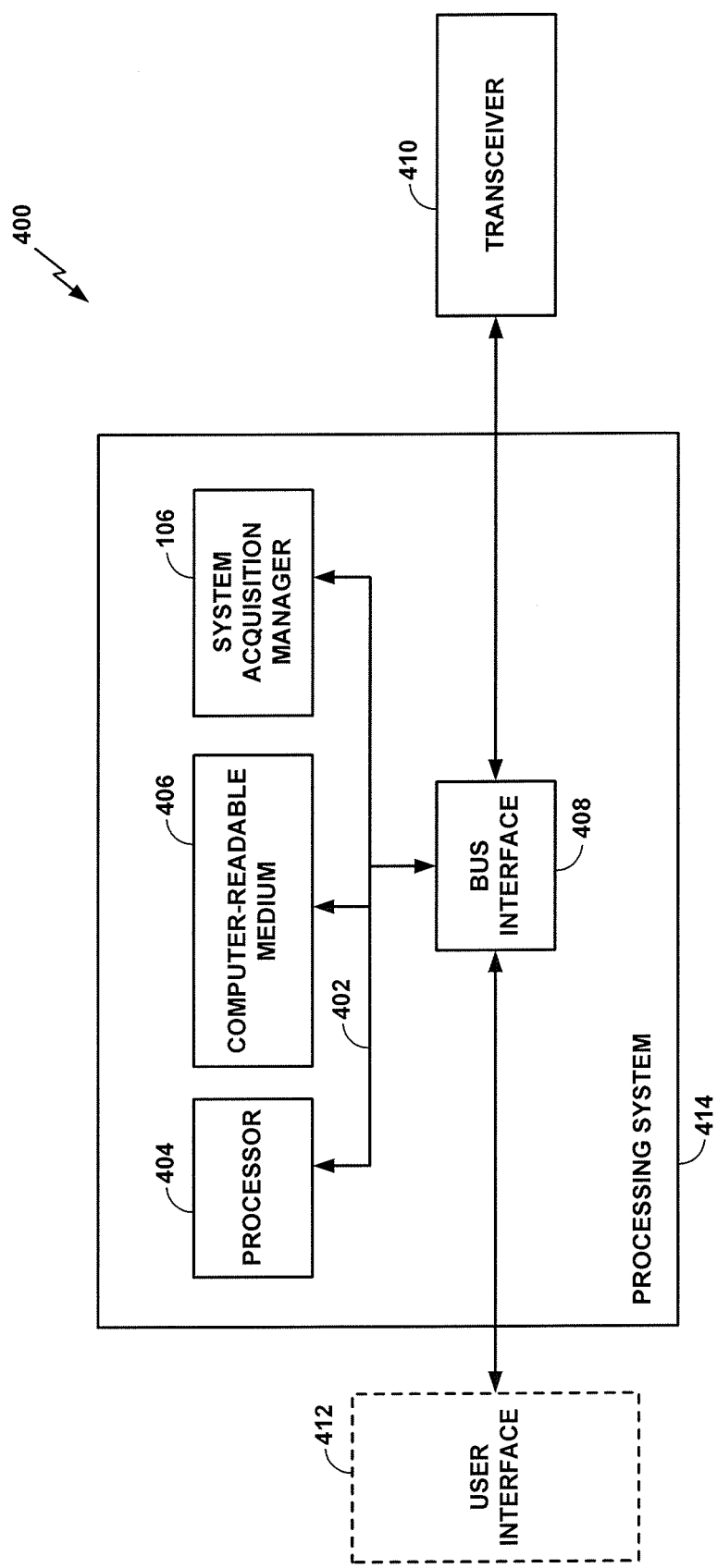
FIG. 4 is a diagram illustrating an example of a hardware implementation for an apparatus employing a processing system according to some embodiments.

FIG. 4 is a conceptual diagram illustrating an example of a hardware implementation for an apparatus 400 employing a processing system 414. In some examples, the processing system 414 may comprise a UE or a component of a UE (e.g., UE 102 of FIG. 1). In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, computer-readable media, represented generally by the computer-readable medium 406, and an system acquisition manager 106 (see FIGS. 1 and 2), which may be configured to carry out one or more methods or procedures described herein.

The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software. Furthermore, in some examples, system acquisition manager 106 may be implemented as hardware, software, or a combination of hardware and software in the processing system 414. For example, computer-readable medium 406 may include instructions that, when executed by processor 404, may perform one or more of the aspects of system acquisition manager 106 described herein. In addition, the components of system acquisition manager 106 presented in FIG. 2 may likewise be implemented as hardware, software, or a combination of hardware and software in the processing system 414.

Figure 5:
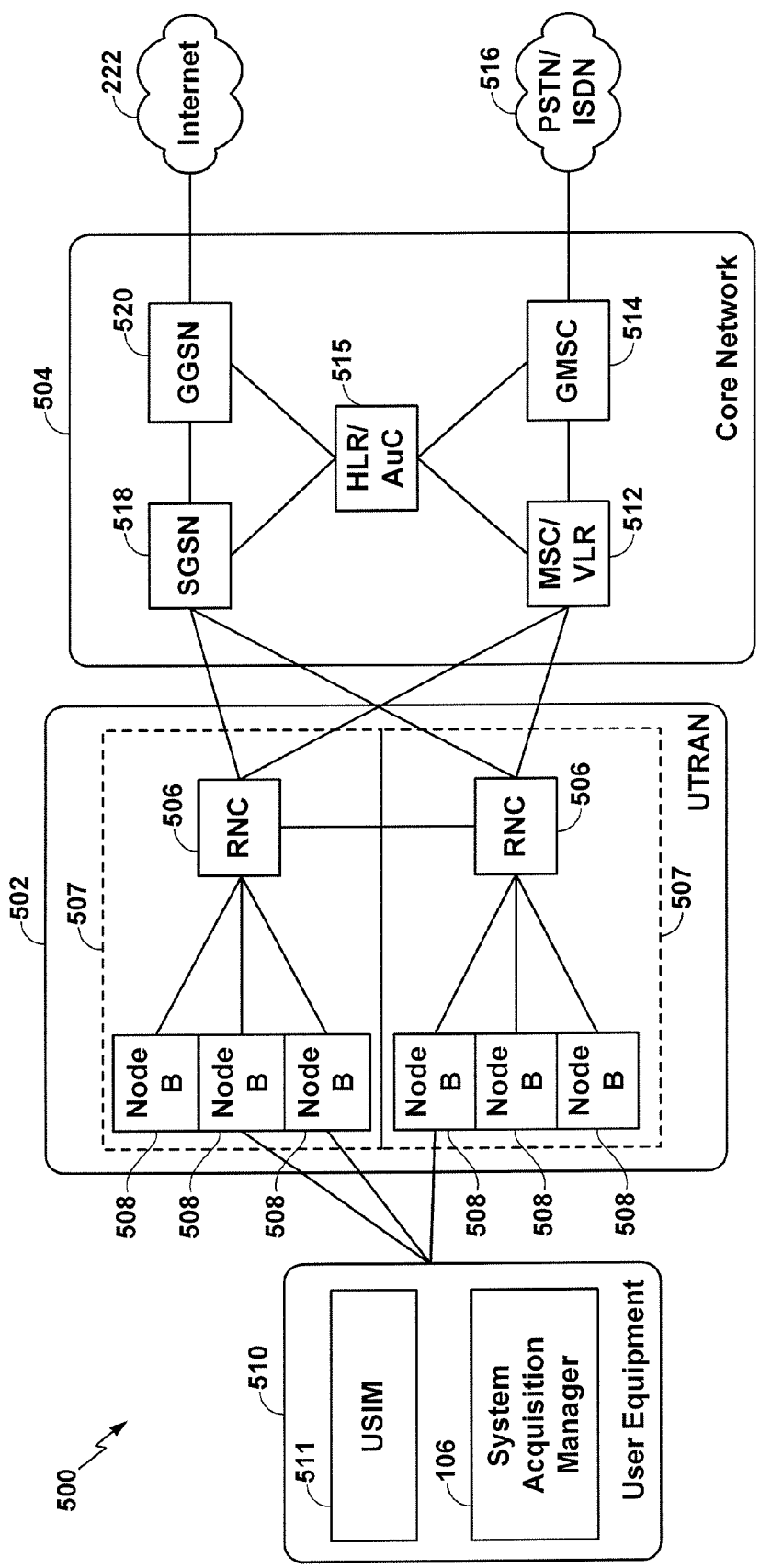
FIG. 5 is a block diagram conceptually illustrating an example of a telecommunications system according to some embodiments.

The various concepts presented throughout this disclosure may be implemented across a broad variety of telecommunication systems, network architectures, and communication standards. By way of example and without limitation, the aspects of the present disclosure illustrated in FIG. 5 are presented with reference to a UMTS system 500 employing a W-CDMA air interface. A UMTS network includes three interacting domains: a Core Network (CN) 504, a UMTS Terrestrial Radio Access Network (UTRAN) 502, and User Equipment (UE) 510. In this example, the UTRAN 502 provides various wireless services including telephony, video, data, messaging, broadcasts, and/or other services. The UTRAN 502 may include a plurality of Radio Network Subsystems (RNSs) such as an RNS 507, each controlled by a respective Radio Network Controller (RNC) such as an RNC 506. Here, the UTRAN 502 may include any number of RNCs 506 and RNSs 507 in addition to the RNCs 506 and RNSs 507 illustrated herein. The RNC 506 is an apparatus responsible for, among other things, assigning, reconfiguring and releasing radio resources within the RNS 507. The RNC 506 may be interconnected to other RNCs (not shown) in the UTRAN 502 through various types of interfaces such as a direct physical connection, a virtual network, or the like, using any suitable transport network.

Communication between a UE 510 and a Node B 508 may be considered as including a physical (PHY) layer and a medium access control (MAC) layer. Further, communication between a UE 510 and an RNC 506 by way of a respective Node B 508 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the SRNS 507 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 508 are shown in each SRNS 507; however, the SRNSs 507 may include any number of wireless Node Bs. The Node Bs 508 provide wireless access points to a core network (CN) 504 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 510 may further include a universal subscriber identity module (USIM) 511, which contains a user's subscription information to a network. In an aspect, UE 510 may be a multi-SIM device and may include a system acquisition manager 106 as described in relation to FIGS. 1 and 2, above. For illustrative purposes, one UE 510 is shown in communication with a number of the Node Bs 508. The downlink (DL), also called the forward link, refers to the communication link from a Node B 508 to a UE 510, and the uplink (UL), also called the reverse link, refers to the communication link from a UE 510 to a Node B 508.

The core network 504 interfaces with one or more access networks, such as the UTRAN 502. As shown, the core network 504 is a GSM core network. However, as those skilled in the art will recognize, the various concepts presented throughout this disclosure may be implemented in a RAN, or other suitable access network, to provide UEs with access to types of core networks other than GSM networks.

The core network 504 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 504 supports circuit-switched services with a MSC 512 and a GMSC 514. In some applications, the GMSC 514 may be referred to as a media gateway (MGW). One or more RNCs, such as the RNC 506, may be connected to the MSC 512. The MSC 512 is an apparatus that controls call setup, call routing, and UE mobility functions. The MSC 512 also includes a visitor location register (VLR) that contains subscriber-related information for the duration that a UE is in the coverage area of the MSC 512. The GMSC 514 provides a gateway through the MSC 512 for the UE to access a circuit-switched network 516. The core network 504 includes a home location register (HLR) 515 containing subscriber data, such as the data reflecting the details of the services to which a particular user has subscribed. The HLR is also associated with an authentication center (AuC) that contains subscriber-specific authentication data. When a call is received for a particular UE, the GMSC 514 queries the HLR 515 to determine the UE's location and forwards the call to the particular MSC serving that location.

The core network 504 also supports packet-data services with a serving GPRS support node (SGSN) 518 and a gateway GPRS support node (GGSN) 520. GPRS, which stands for General Packet Radio Service, is designed to provide packet-data services at speeds higher than those available with standard circuit-switched data services. The GGSN 520 provides a connection for the UTRAN 502 to a packet-based network 522. The packet-based network 522 may be the Internet, a private data network, or some other suitable packet-based network. The primary function of the GGSN 520 is to provide the UEs 510 with packet-based network connectivity. Data packets may be transferred between the GGSN 520 and the UEs 510 through the SGSN 518, which performs primarily the same functions in the packet-based domain as the MSC 512 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 508 and a UE 510. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 6:
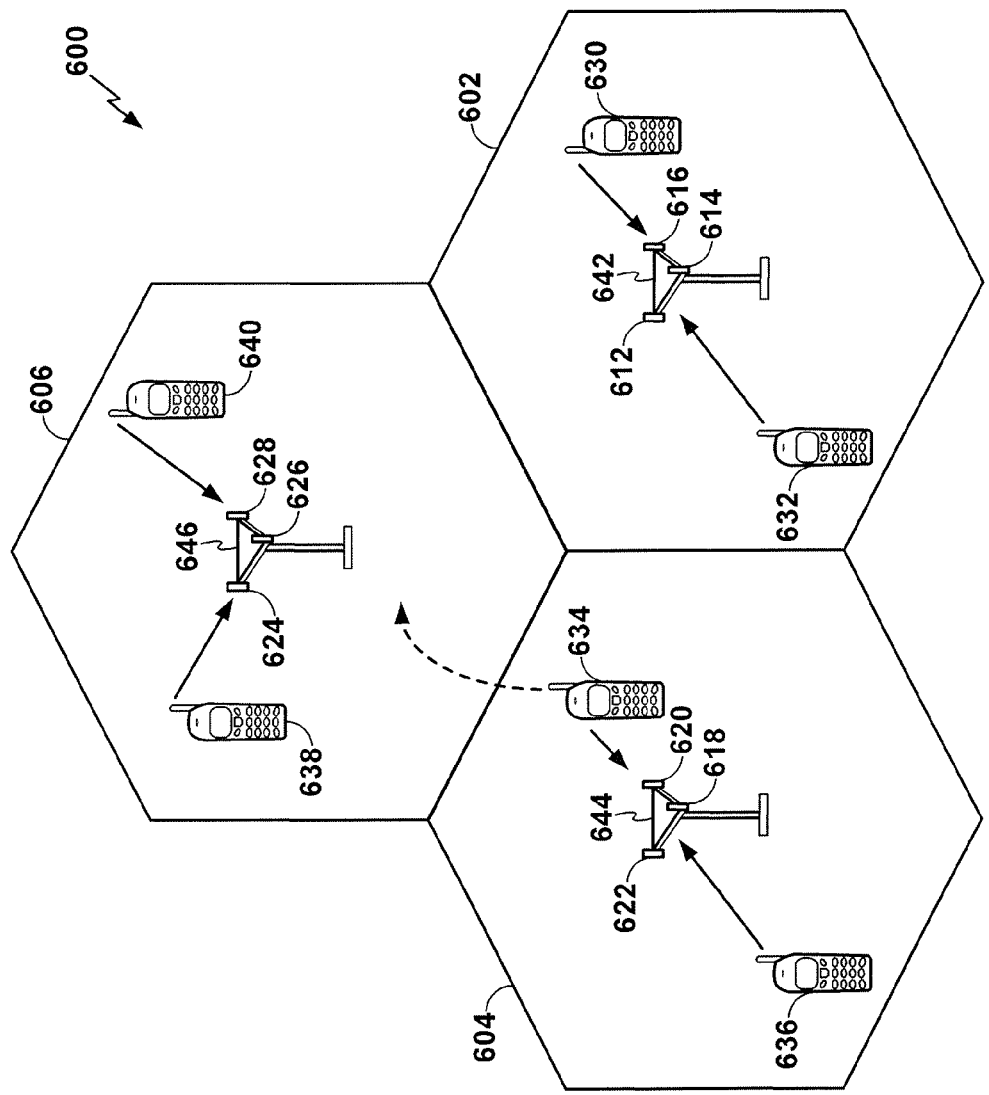
FIG. 6 is a conceptual diagram illustrating an example of an access network according to some embodiments.

Referring to FIG. 6, an access network 600 in a UTRAN architecture is illustrated. In an example aspect, the UTRAN architecture may be associated with a network of a primary and/or secondary subscription of UE 102 where UE 102 comprises a multi-SIM device. The multiple access wireless communication system includes multiple cellular regions (cells), including cells 602, 604, and 606, each of which may include one or more sectors. The multiple sectors can be formed by groups of antennas with each antenna responsible for communication with UEs in a portion of the cell. For example, in cell 602, antenna groups 612, 614, and 616 may each correspond to a different sector. In cell 604, antenna groups 618, 620, and 622 each correspond to a different sector. In cell 606, antenna groups 624, 626, and 628 each correspond to a different sector. The cells 602, 604 and 606 may include several wireless communication devices, e.g., User Equipment or UEs, which may be in communication with one or more sectors of each cell 602, 604 or 606. For example, UEs 630 and 632 may be in communication with Node B 642, UEs 634 and 636 may be in communication with Node B 644, and UEs 638 and 640 (which may represent UE 102 of FIG. 1) can be in communication with Node B 646. Here, each Node B 642, 644, 646 is configured to provide an access point to a core network 204 (see FIG. 2) for all the UEs 630, 632, 634, 636, 638, 640 in the respective cells 602, 604, and 606. In an aspect, each of the UEs presented in FIG. 6 may comprise UE 102 of FIG. 1 and may include a system acquisition manager 106 of FIGS. 1 and 2.

As the UE 634 moves from the illustrated location in cell 604 into cell 606, a serving cell change (SCC) or handover may occur in which communication with the UE 634 transitions from the cell 604, which may be referred to as the source cell, to cell 606, which may be referred to as the target cell. Management of the handover procedure may take place at the UE 634, at the Node Bs corresponding to the respective cells, at a radio network controller 506 (see FIG. 5), or at another suitable node in the wireless network. For example, during a call with the source cell 604, or at any other time, the UE 634 may monitor various parameters of the source cell 604 as well as various parameters of neighboring cells such as cells 606 and 602. Further, depending on the quality of these parameters, the UE 634 may maintain communication with one or more of the neighboring cells. During this time, the UE 634 may maintain an Active Set, that is, a list of cells that the UE 634 is simultaneously connected to (i.e., the UTRA cells that are currently assigning a downlink dedicated physical channel DPCH or fractional downlink dedicated physical channel F-DPCH to the UE 634 may constitute the Active Set).

The modulation and multiple access scheme employed by the access network 600 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 6rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 02.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 6GPP organization. CDMA2000 and UMB are described in documents from the 6GPP2 organization. The actual wireless communication standard and the multiple access technology employed will depend on the specific application and the overall design constraints imposed on the system.

Figure 7:
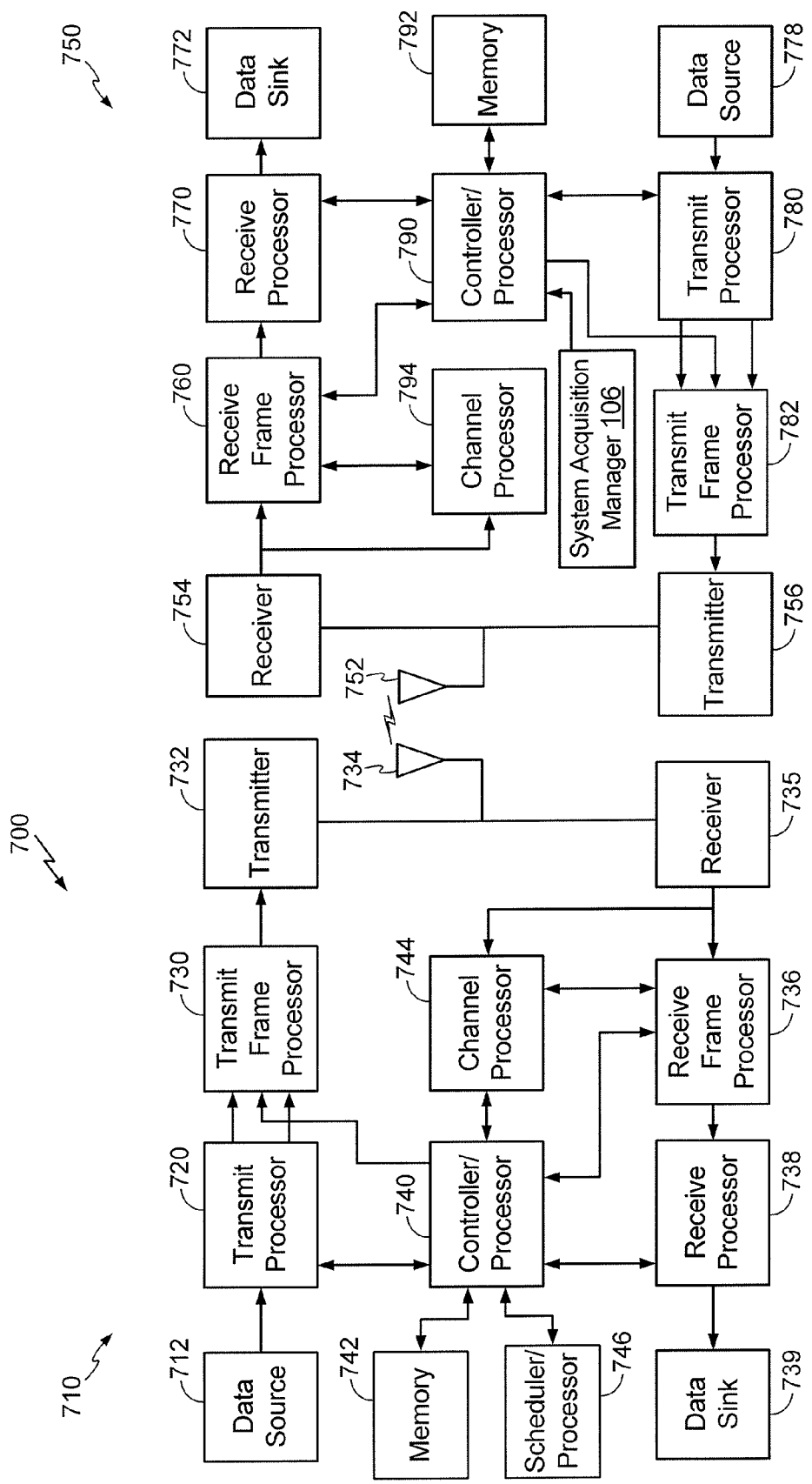
FIG. 7 is a block diagram conceptually illustrating an example of a Node B in communication with a UE in a telecommunications system according to some embodiments.

FIG. 7 is a block diagram of a Node B 710 in communication with a UE 750, where the Node B 710 may be the first subscription network entity 104 in FIG. 1, and the UE 750 may be the UE 102 of FIG. 1. For example, UE 750 may be a multi-SIM device and may include system acquisition manager 106 and may be configured to perform the functions associated with system acquisition manager 106 presented throughout the present disclosure. In the downlink communication, a transmit processor 720 may receive data from a data source 712 and control signals from a controller/processor 740. The transmit processor 720 provides various signal processing functions for the data and control signals, as well as reference signals (e.g., pilot signals). For example, the transmit processor 720 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 744 may be used by a controller/processor 740 to determine the coding, modulation, spreading, and/or scrambling schemes for the transmit processor 720. These channel estimates may be derived from a reference signal transmitted by the UE 750 or from feedback from the UE 750. The symbols generated by the transmit processor 720 are provided to a transmit frame processor 730 to create a frame structure. The transmit frame processor 730 creates this frame structure by multiplexing the symbols with information from the controller/processor 740, resulting in a series of frames. The frames are then provided to a transmitter 732, which provides various signal conditioning functions including amplifying, filtering, and modulating the frames onto a carrier for downlink transmission over the wireless medium through antenna 734. The antenna 734 may include one or more antennas, for example, including beam steering bidirectional adaptive antenna arrays or other similar beam technologies.

At the UE 750, a receiver 754 receives the downlink transmission through an antenna 752 and processes the transmission to recover the information modulated onto the carrier. The information recovered by the receiver 754 is provided to a receive frame processor 760, which parses each frame, and provides information from the frames to a channel processor 794 and the data, control, and reference signals to a receive processor 770. The receive processor 770 then performs the inverse of the processing performed by the transmit processor 720 in the Node B 710. More specifically, the receive processor 770 descrambles and despreads the symbols, and then determines the most likely signal constellation points transmitted by the Node B 710 based on the modulation scheme. These soft decisions may be based on channel estimates computed by the channel processor 794. The soft decisions are then decoded and deinterleaved to recover the data, control, and reference signals. The CRC codes are then checked to determine whether the frames were successfully decoded. The data carried by the successfully decoded frames will then be provided to a data sink 772, which represents applications running in the UE 750 and/or various user interfaces (e.g., display). Control signals carried by successfully decoded frames will be provided to a controller/processor 790. When frames are unsuccessfully decoded by the receiver processor 770, the controller/processor 790 may also use an acknowledgement (ACK) and/or negative acknowledgement (NACK) protocol to support retransmission requests for those frames.

In the uplink, data from a data source 778 and control signals from the controller/processor 790 are provided to a transmit processor 780. The data source 778 may represent applications running in the UE 750 and various user interfaces (e.g., keyboard). Similar to the functionality described in connection with the downlink transmission by the Node B 710, the transmit processor 780 provides various signal processing functions including CRC codes, coding and interleaving to facilitate FEC, mapping to signal constellations, spreading with OVSFs, and scrambling to produce a series of symbols. Channel estimates, derived by the channel processor 794 from a reference signal transmitted by the Node B 710 or from feedback contained in the midamble transmitted by the Node B 710, may be used to select the appropriate coding, modulation, spreading, and/or scrambling schemes. The symbols produced by the transmit processor 780 will be provided to a transmit frame processor 782 to create a frame structure. The transmit frame processor 782 creates this frame structure by multiplexing the symbols with information from the controller/processor 790, resulting in a series of frames. The frames are then provided to a transmitter 756, which provides various signal conditioning functions including amplification, filtering, and modulating the frames onto a carrier for uplink transmission over the wireless medium through the antenna 752.

The uplink transmission is processed at the Node B 710 in a manner similar to that described in connection with the receiver function at the UE 750. A receiver 735 receives the uplink transmission through the antenna 734 and processes the transmission to recover the information modulated onto the carrier. The information recovered by the receiver 735 is provided to a receive frame processor 736, which parses each frame, and provides information from the frames to the channel processor 744 and the data, control, and reference signals to a receive processor 738. The receive processor 738 performs the inverse of the processing performed by the transmit processor 780 in the UE 750. The data and control signals carried by the successfully decoded frames may then be provided to a data sink 739 and the controller/processor, respectively. If some of the frames were unsuccessfully decoded by the receive processor, the controller/processor 740 may also use an acknowledgement (ACK) and/or negative acknowledgement (NACK) protocol to support retransmission requests for those frames.

The controller/processors 740 and 790 may be used to direct the operation at the Node B 710 and the UE 750, respectively. For example, the controller/processors 740 and 790 may provide various functions including timing, peripheral interfaces, voltage regulation, power management, and other control functions. The computer readable media of memories 742 and 792 may store data and software for the Node B 710 and the UE 750, respectively. A scheduler/processor 746 at the Node B 710 may be used to allocate resources to the UEs and schedule downlink and/or uplink transmissions for the UEs.

Several aspects of a telecommunications system have been presented with reference to an HSPA system. As those skilled in the art will readily appreciate, various aspects described throughout this disclosure may be extended to other telecommunication systems, network architectures and communication standards.

By way of example, various aspects may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods or methodologies described herein may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one"

unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, or 35 U.S.C. §112(f), whichever is appropriate, unless the element is expressly recited using the phrase "means for" or, in the case of a method claim, the element is recited using the phrase "step for."

We claim:

1. A method of acquiring a wireless system by a multi-subscriber identity module (SIM) user equipment (UE), the method comprising:
    conducting, by a first subscription corresponding to a first SIM of the UE, a call using a shared radio resource of the UE;
    predicting, upon completion of the call, a pilot timing error and a frequency error for a pilot signal of a network associated with a second subscription corresponding to a second SIM of the UE; and
    attempting to acquire the pilot signal based on the pilot timing error and the frequency error using the shared radio resource.

2. The method of claim 1, further comprising:
    calculating a temperature difference between a first temperature of the UE measured before the call and a second temperature measured after completion of the call; and
    comparing the pilot timing error to a pilot increment delay associated with the pilot signal;
    wherein attempting to acquire the pilot signal based on the timing error and the frequency error occurs where both the temperature difference is less than or equal to a temperature difference threshold and the pilot timing error is less than or equal to the pilot increment delay.

3. The method of claim 2, wherein the temperature difference threshold comprises 4 degrees Celsius.

4. The method of claim 2, wherein the pilot increment delay is based on a pilot pseudonoise offset of a sector associated with a network entity.

5. The method of claim 1, wherein the pilot timing error is based on an elapsed time of the call.

6. The method of claim 1, wherein the pilot signal is transmitted by a cell upon which the second subscription camped immediately preceding the call.

7. The method of claim 1, further comprising:
    determining that each of a plurality of pilot signals corresponding to each subscription of the UE is acquired; and
    initiating a slotted mode of radio resource allocation based on determining that each of the plurality of pilot signals is acquired.

8. The method of claim 1, further comprising refraining from declaring a system associated with the second subscription lost during the call.

9. A multi-subscriber identity module (SIM) user equipment (UE), comprising:
    a communications component configured to conduct, by a first subscription corresponding to a first SIM of the UE, a call using a shared radio resource of the UE;
    a pilot timing error predicting component configured to predict, upon completion of the call, a pilot timing error for a pilot signal of a network associated with a second subscription corresponding to a second SIM of the UE;
    a frequency error predicting component configured to predict a frequency error for the pilot signal; and
    a pilot signal acquisition component configured to attempt to acquire the pilot signal based on the pilot timing error and the frequency error using the shared radio resource.

10. The multi-SIM UE of claim 9, wherein:
    the frequency error predicting component is configured to calculate a temperature difference between a first temperature of the UE measured before the call and a second temperature of the UE measured after completion of the call; and
    the pilot signal acquisition component is configured to:
        compare the pilot timing error to a pilot increment delay associated with the pilot signal; and
        attempt to acquire the pilot signal based on the timing error and the frequency error where both the temperature difference is less than or equal to a temperature difference threshold and the pilot timing error is less than or equal to the pilot increment delay.

11. The multi-SIM UE of claim 10, wherein the temperature difference threshold comprises 4 degrees Celsius.

12. The multi-SIM UE of claim 10, wherein the pilot increment delay is based on a pilot pseudonoise offset of a sector associated with a network entity.

13. The multi-SIM UE of claim 9, wherein the pilot timing error is based on an elapsed time of the call.

14. The multi-SIM UE of claim 9, wherein the pilot signal is transmitted by a cell upon which the second subscription camped immediately preceding the call.

15. The multi-SIM UE of claim 9, wherein the communications component is configured to:
    determine that each of a plurality of pilot signals corresponding to each subscription of the UE is acquired; and
    initiate a slotted mode of radio resource allocation based on determining that each of the plurality of pilot signals is acquired.

16. A multi-subscriber identity module (SIM) user equipment (UE), comprising:
    means for conducting, by a first subscription corresponding to a first SIM of the UE, a call using a shared radio resource of the UE;
    means for predicting, upon completion of the call, a pilot timing error and a frequency error for a pilot signal of a network associated with the second subscription corresponding to a second SIM of the UE; and
    means for attempting to acquire the pilot signal based on the pilot timing error and the frequency error using the shared radio resource.

17. The multi-SIM UE of claim 16, further comprising:
    means for calculating a temperature difference between a first temperature of the UE measured before the call and a second temperature of the UE measured after completion of the call; and
    means for comparing the pilot timing error to a pilot increment delay associated with the pilot signal; and
    means for attempting to acquire the pilot signal based on the timing error and the frequency error where both the temperature difference is less than or equal to a temperature difference threshold and the pilot timing error is less than or equal to the pilot increment delay.

18. The multi-SIM UE of claim 17, wherein the temperature difference threshold comprises 4 degrees Celsius.

19. The multi-SIM UE of claim 17, wherein the pilot increment delay is based on a pilot pseudonoise offset of a sector associated with a network entity.

20. The multi-SIM UE of claim 16, wherein the pilot timing error is based on an elapsed time of the call.

21. The multi-SIM UE of claim 16, wherein the pilot signal is transmitted by a cell upon which the second subscription camped immediately preceding the call.

22. The multi-SIM UE of claim 16, further comprising:
   means for determining that each of a plurality of pilot signals corresponding to each subscription of the UE is acquired; and
   means for initiating a slotted mode of radio resource allocation based on determining that each of the plurality of pilot signals is acquired.

23. The multi-SIM UE of claim 16, further comprising means for refraining from declaring a system associated with the second subscription lost during the call.

24. A non-transitory computer-readable storage medium, comprising instructions, that when executed by a processor, cause the processor to:
   conduct, by a first subscription corresponding to a first subscriber identity module (SIM) of a multi-SIM user equipment (UE), a call using a shared radio resource of the UE;
   predict, upon completion of the call, a pilot timing error and a frequency error for a pilot signal of a network associated with a second subscription corresponding to a second SIM of the UE; and
   attempt to acquire the pilot signal based on the pilot timing error and the frequency error using the shared radio resource.

25. The non-transitory computer-readable medium of claim 24, further comprising instructions, that when executed by the processor, cause the processor to:
   calculate a temperature difference between a first temperature of the UE measured before the call and a second temperature of the UE measured after completion of the call; and
   compare the pilot timing error to a pilot increment delay associated with the pilot signal,
   wherein attempting to acquire the pilot signal based on the timing error and the frequency error occurs where both the temperature difference is less than or equal to a temperature difference threshold and the pilot timing error is less than or equal to the pilot increment delay.

26. The non-transitory computer-readable medium of claim 25, wherein the temperature difference threshold comprises 4 degrees Celsius.

27. The non-transitory computer-readable medium of claim 25, wherein the pilot increment delay is based on a pilot pseudonoise offset of a sector associated with a network entity.

28. The non-transitory computer-readable medium of claim 24, wherein the pilot timing error is based on an elapsed time of the call.

29. The non-transitory computer-readable medium of claim 24, wherein the pilot signal is transmitted by a cell upon which the second subscription camped immediately preceding the call.

30. The non-transitory computer-readable medium of claim 24, further comprising instructions, that when executed by the processor, cause the processor to:
   determine that each of a plurality of pilot signals corresponding to each subscription of the UE is acquired; and
   initiate a slotted mode of radio resource allocation based on determining that each of the plurality of pilot signals is acquired.

* * * * *